United States Patent [19]

Kawabata

[11] Patent Number: 4,594,109

[45] Date of Patent: Jun. 10, 1986

[54] AQUEOUS COMPOSITION FOR THE PROTECTION OF PAINT SURFACES

[75] Inventor: Nobuaki Kawabata, Yokohama, Japan

[73] Assignee: Nippon Oil Co., Ltd., Tokyo, Japan

[21] Appl. No.: 766,345

[22] Filed: Aug. 16, 1985

[30] Foreign Application Priority Data

Aug. 25, 1984 [JP] Japan .............................. 59-177196

[51] Int. Cl.$^4$ ............................................. C08J 3/02
[52] U.S. Cl. ..................................... 106/271; 524/269; 524/276; 524/277; 524/475
[58] Field of Search ................ 523/223; 524/261, 277, 524/269, 276, 475; 106/271

[56] References Cited

U.S. PATENT DOCUMENTS

| | | | |
|---|---|---|---|
| 2,768,908 | 10/1956 | Cull ..................... | 524/261 |
| 3,420,790 | 1/1969 | Gassner et al. ..................... | 524/277 |
| 3,540,580 | 11/1970 | Whitestone et al. ................ | 524/269 |
| 4,371,634 | 2/1983 | Hoffman et al. ..................... | 523/223 |
| 4,398,953 | 8/1983 | Van der Linde ..................... | 106/271 |
| 4,404,035 | 9/1983 | Ona et al. .............................. | 524/277 |
| 4,442,140 | 4/1984 | Kawabata et al. ................. | 427/353 |
| 4,468,254 | 8/1984 | Yokoyama et al. .................. | 524/62 |

FOREIGN PATENT DOCUMENTS

| | | | |
|---|---|---|---|
| 642770 | 6/1962 | Canada .................................. | 524/277 |
| 0042281 | 12/1981 | European Pat. Off. ............ | 524/269 |
| 53-92393 | 8/1978 | Japan ..................................... | 524/277 |
| 55-90565 | 7/1980 | Japan ..................................... | 524/269 |
| 689850 | 4/1953 | United Kingdom ................ | 524/261 |
| 1572906 | 8/1980 | United Kingdom ................ | 524/269 |

*Primary Examiner*—Joseph L. Schofer
*Assistant Examiner*—N. Sarofin
*Attorney, Agent, or Firm*—Oblon, Fisher, Spivak, McClelland & Maier

[57] ABSTRACT

An aqueous composition for the protection of paint surfaces comprises [A] a solid emulsion component composed of (a) an oxygen-containing wax, (b) a polybutene and (c) a silicone oil; [B] a powdery emulsion component composed of (d) substantially white-colored fine powder of a silicon-containing inorganic material and (e) white-colored fine powder of a silicon-free inorganic or organic material; and [C] an emulsifier component.

25 Claims, No Drawings

AQUEOUS COMPOSITION FOR THE PROTECTION OF PAINT SURFACES

BACKGROUND OF THE INVENTION

1. Field of the Invention:

This invention relates to aqueous compositions for the protection of paint surfaces. More particularly, it relates to an aqueous composition for the protection of such surfaces which is applied to automobiles, agricultural machinery, construction machinery, and other types of machinery and implements for the purpose of protecting their paint surfaces temporarily.

2. Description of the Prior Art:

During the period of time extending from the shipment of commercial products such as automobiles and the like to their delivery to ultimate purchasers, their paint surfaces are often stained by exposure to weather, moisture, sunlight, air, dusts, bird droppings, and atmospheric contaminants such as smoke and the like. This results in an impairment of their commercial value. In recent years, a variety of paint surface protective agents have been developed in order to prevent commercial products from suffering such damage. Among the paint surface protective agents developed for this purpose are, for example, a dispersion of wax in a solvent (as disclosed in Japanese Patent Laid-open No. 28534/'75), a strippable film-forming composition (as disclosed in Japanese Patent Publication No. 7303/'79) which can be stripped off after use, a dispersion of wax and solid powder in a solvent (as disclosed in Japanese Patent Laid-open No. 149188/'76 or 62978/'80) which can be wiped off by hand, and an aqueous wax emulsion (as disclosed in Japanese Patent Publication No. 34030/'70).

Each of the paint surface protective agents which are currently in wide use takes the form of a dispersion of wax in a solvent or a dispersion of wax and solid powder in a solvent. They form wax coatings by evaporating the greater parts of their solvents. The disadvantages of such solvent-type compositions have recently been discussed from the viewpoint of environmental protection, resource saving, economy, safety and the like. Moreover, a dispersion of wax in a solvent cannot be removed with steam alone, so that the addition of a small amount of kerosene is required. In order to overcome this disadvantage, there has been proposed a dispersion of wax and solid powder in a solvent wherein the wax and the solid powder are homogeneously mixed to decrease the mechanical strength of the wax coating and thereby facilitate wiping-off of the wax coating. However, the wax coating so formed is defective in protective power. That is, it has the disadvantage of being liable to peel off at a touch and subject to attack by acid rainwater.

On the other hand, an aqueous wax emulsion contains no solvent and, therefore, eliminates the possibilities of environmental pollution and fire hazard. Unlike solvent-type compositions, however, this aqueous composition involves a number of additional performance requirements typified by drying properties and dispersibility in water. Moreover, the protective coating formed thereby must be highly resistant to rainwater and moisture and, at the same time, easily removable after use. An aqueous composition which fully satisfies these conflicting performance requirements still remains to be developed.

To overcome the disadvantages of solvent type compositions in enviromental pollution, resource saving, fire hazard and the like, the present inventors previously developed an aqueous composition of powder-wax type which composition requires no solvent in either case of applying or stripping operation where the coatings are readily removed by hot water alone (Japanese Patent Laid-open No. 182368/'82). Although this composition has many advantages over the prior compositions, the tropical severe outdoor tests of resultant wax coatings showed peeling off in part of the coatings due to the weather and remaining stains after an operating of removing the coatings by a hot water washer.

SUMMARY OF THE INVENTION

The present inventors have thus conducted an extensive research with a view toward making improvements to the aqueous compositions, which are disclosed in Japanese Patent Laid-open No. 182368/'82 and suited for the protection of paint surfaces, so as to overcome the above-described problems while retaining their excellent properties, leading to completion of the present invention.

It is an object of the present invention to provide an aqueous composition for the protection of paint surfaces which forms a tough coating resistant to rainwater, moisture, sunlight and atmospheric contaminants even under severe environmental conditions without using any solvent and which, after use, can be readily removed with hot water, steam or the like. The present invention therefore provides an aqueous composition for the protection of paint surfaces which comprises, as essential components emulsified and dispersed in water, the following components [A], [B] and [C]:

[A] a solid emulsion component composed of the following sub-components (a)–(c): (a) 100 parts by weight of an oxygen-containing wax having an oxygen content of not less than 3.0% by weight and a melting point of 50° to 85° C., (b) 0.1–60 parts by weight of a polybutene having a number-average molecular weight of 300 –3,000, and (c) 10–200 parts by weight of a silicone oil having a viscosity of 50 –5,000 cst. at 25° C;

[B] a powdery emulsion component composed of the following sub-components (d)–(e):

(d) 0.2–20.0 times by weight the solid emulsion component [A] of substantially white-colored fine powder of an inorganic material having a silicon content of not less than 23% by weight, and (e) 0.2–30.0 times by weight the solid emulsion component [A] of white-colored fine powder of an inorganic or organic material substantially free of silicon; and

[C] less than 0.2 times by weight the solid emulsion component [A] of an emulsifier component.

DETAILED DESCRIPTION OF THE PREFERRED EMBODIMENTS

The aqueous composition according to this invention, which is suited for the protection of paint surfaces, will hereinafter be described specifically.

In the present invention, the solid emulsion component [A] is composed of the following subcomponents (a)–(c).

The component (a) used in the composition of the present invention is an oxygen-containing wax having an oxygen content of not less than 3.0% by weight, preferably not less than 5.0% by weight, and a melting point of 50° to 85° C. The term "oxygen content" as used herein refers to that determined by a modification of Unterzaucher's method (or a thermal conductivity method), and detailed information on this method of oxygen determination is found, for example, in an article by Robert Clumo (Mikrochimica Acta, 1968, 811). Oxygen-containing waxes having oxygen contents of not less than 3.0% by weight can satisfactorily be emulsified with the aid of a small amount of emulsifier, so that no undue decrease in drying properties, water resistance or weather resistance is caused by the emulsifier. Moreover, suitable oxygen-containing waxes have melting points within the range of 50° to 85° C. If a wax having a melting point lower than the lower limit of the aforesaid range is used, sagging or running of the coating occurs, while if a wax having a melting point higher than the upper limit of the aforesaid range is used, it becomes difficult to remove the coating with hot water.

Typical examples of the oxygen-containing waxes which can be suitably used as the component (a) in the composition of the present invention include natural waxes such as carnauba wax, montan wax, rice bran wax, beeswax and Japan wax; synthetic waxes such as oxidized microcrystalline wax and oxidized paraffin wax; the secondary products obtained by modifying the foregoing waxes through various reactions; maleinized waxes obtained individually by the addition reaction of a hydrocarbon wax with maleic anhydride; and the like.

A preferred oxygen-containing wax suitable for use in the composition of the present invention is a product obtained by reacting 100 parts by weight of a hydrocarbon wax having a melting point of 50° to 85° C. with 3 to 25 parts by weight of an unsaturated polycarboxylic acid or an anhydride thereof. Detailed information on the process of making such an oxygen-containing wax is found, for example, in Japanese Patent Laid-open No. 96094/'74 filed in the name of the present inventors.

A more preferred oxygen-containing wax suitable for use in the composition of the present invention is a product obtained by mixing 10 to 80 parts by weight of a petroleum fraction wax having a melting point of 50° to 85° C. with 90 to 20 parts by weight of a polyolefin wax having a melting point of 36 to 120° C., a number-average molecular weight of 310 to 1,000, and 5 to 50 double bonds per 1,000 carbon atoms and reacting 100 parts by weight of the resulting mixture with 3 to 25 parts by weight of an unsaturated polycarboxylic acid or an anhydride thereof under free radical-forming conditions. Detailed information on the process of making such an oxygen-containing wax is found, for example, in Japanese Patent Laid-open No. 81306/'79 filed in the name of the present inventors.

Since oxygen-containing waxes (a) as defined above are excellent in emulsifiability, they require smaller amounts of emulsifier for the preparation of aqueous compositions than other petroleum fraction waxes do. Accordingly, no undue decrease in water resistance, drying properties, weather resistance or the like is caused by the emulsifier. Moreover, they have relative low melting points and show no adhesive properties, so that protective coatings containing them can readily be removed by means of a hot water cleaner or the like. On the other hand, petroleum fraction waxes, specifically, paraffin wax, microcrystalline wax and the like can be used in solvent-type compositions without any difficulties. However, where it is desired to form them into aqueous compositions for the purpose of environmental protection, fire prevention and the like, large amounts of emulsifier are required because of their inadequate emulsifiability. This leads not only to decreases in water resistance, drying properties, weather resistance and the like, but also to economic disadvantages. Furthermore, these petroleum fraction waxes have adhesive properties which may result in poor removability as well as discoloration and/or loss in luster of the paint surfaces on automobiles.

On the other hand, the term "sub-component (b)" as used herein means a polybutene having a number-average molecular weight of 300–3,000, or preferably 700–1,500. Since polybutenes having number-average molecular weights not reaching 300 are low-viscosity liquids, resulting coatings have lower strengths and reduced water resistance. Use of such polybutenes is hence not preferred. Polybutenes having number-average molecular weights greater than 3,000 have extremely high viscosities and exhibit poor workability upon their incorporation and emulsification in waxes. Use of such polybutene is thus not preferred.

Incidentally, the polybutene (b) useful in the preparation of the composition of the present invention can be prepared in accordance with a process known per se in the art, using as a raw material a mixture of butene-1, butene-2, isobutylene and as inert components, butanes. As a representative preparation process, the B—B fraction (butane-butene fraction) which occurs as a by-product upon production of ethylene, propylene and the like, for example, by cracking naphtha may be polymerized as a raw material at reaction temperatures of from about −30° C. to +30° C., by using a Friedel-Crafts catalyst such as aluminum chloride, magnesium chloride, boron fluoride or titanium tetrachloride or a complex thereof as a catalyst and by either employing or not particularly employing an organohalide or hydrochloric acid as a co-catalyst. When the B—B fraction is used, it is general not to use any solvent since butane and unreacted olefins serve as solvents. The thus-obtained polybutene is usually delivered to a settling tank, where the catalyst is separated. Any remaining trace catalyst is thereafter completely removed by applying, either singly or in combination, various methods such as washing with an alkali and then with water, washing with an aqueous solution of the sodium or ammonium salt of nitric acid, sulfuric acid, oxalic acid or the like, adsorption on bauxite, activated clay or the like, etc. Then, any unreacted gases are removed in a flash drum, light polymers are separated in a stripper, and the resultant polybutene is finally purified in a purification tank if necessary. As such preparation processes of polybutene, Amoco process and Cosden process are currently known as representative ones.

In the present invention, it is also possible to use, as the sub-component (b), a hydrogenated polybutene obtained by hydrogenating the double bonds of the above-mentioned polybutene by a method already known in the art, for example, by using nickel or nickel molybdate as a catalyst.

The sub-component (b) may be incorporated in an amount of 0.1–60 parts by weight or preferably, 0.5 –30 parts by weight, both based on 100 parts by weight of the oxygen-containing wax (a). If the sub-component (b) is added in any amounts smaller than the lower limit of the aforesaid broader range, no effects can be brought about from the addition of the sub-component (b) and the resultant coatings have reduced water resistance and waterproofness. It is therefore not preferred to add the sub-component (b) in such a small amount. On the other hand, if the content of the sub-component (b) exceeds the upper limit of the aforesaid broader range, the resultant coatings become less susceptible to removal with hot water. Accordingly, it is not preferred to add the sub-component (b) in such an excess amount.

The sub-component (c), which is useful in the preparation of the composition of the present invention, is a silicone oil having a viscosity of 50–50,000 cst. or preferably 100–1,000 cst. at 25° C. Silicone oils having viscosities lower than 50 cst. at 25° C. are not preferred because the resulting coatings have lowered strengths. On the other hand, silicone oils the viscosities of which are greater than 50,000 cst. are not preferred because the coated paint surfaces remain sticky even after the resultant coatings have been wiped off.

The term "silicone oil (c)" as used herein means that generally available on the market as a silicone oil. It is formed of a straight-chain dimethylpolysiloxane or straight-chain diphenylpolysiloxane of a relatively low polymerization degree. It may usually be prepared by the co-hydrolysis and polycondensation of dimethyldichlorosilane and trimethylmonochlorosilane or by the heating and ring-opening polymerization of octamethylcyclotetrasiloxane and hexamethyldisiloxane.

The sub-component (c) may be incorporated in an amount of 10–200 parts by weight or preferably 30–120 parts by weight, both based on 100 parts by weight of the oxygen-containing wax (a). If the content of the sub-component (c) does not reach the lower limit of the aforesaid broader range, no effects can be brought about from its incorporation. Accordingly, the resultant coatings give poor protection to coated paint surfaces. It is therefore not preferred to use the sub-component (c) in such a small amount. On the other hand, if the content of the sub-component (c) exceeds the upper limit of the aforesaid broader range, the resulting coatings have reduced strengths and are peeled off by wind and rain. It is thus not preferred to incorporate the sub-component (c) in such a large amount.

On the other hand, the powdery emulsion component [B] which is useful in the preparation of the composition of this invention is composed of the following sub-components (d) and (e).

As the sub-component (d) (the substantially white-colored fine powder of inorganic material having a silicon content of not less than 23% by weight) useful in the preparation of the composition of this invention, may be employed one or more substances selected from white-, gray- or cream-colored fine powders of inorganic materials such as silica, clay, diatomaceous earth, talc, aluminum silicate, calcium silicate, zeolite and the like. Among these materials, one or more substances selected from silica, diatomaceous earth and talc, all of which have silica contents of not less than about 34% by weight, are particularly preferred. The sub-component (d) may be used in an amount of 0.2–20.0 times by weight or preferably 0.6–15.0 times by weight the solid emulsion component [A]. It the amount of the sub-component (d) is less than the lower limit of the aforesaid broader range, the resulting composition has poor removability with hot water, while if it is greater than the upper limit of the aforesaid broader range, the resulting composition shows a decrease in protective power. It is therefore not preferred to use the sub-component (d) in any amounts outside the aforesaid broader range.

Substantially white-colored fine powders of inorganic materials, each of which can be suitably used as the sub-component (d) in the composition of the present invention, all contain not less than 23% by weight of silicon, namely, not less than approximately 50% by weight of silica ($SiO_2$). Silica is excellent in water resistance, heat resistance, weather resistance and chemical resistance and is also resistant to acid rainwater, bird droppings and smoke. Moreover, the addition of silica results in a composition which can form soft and smooth white coating characterized by good strippability and removability with hot water.

As the sub-component (e) (which is fine solid powder of an organic or inorganic material substantially free of silicon) used in the composition of the present invention, may be employed one or more materials out of titanium oxide, zinc oxide, calcium carbonate, magnesium carbonate, barium carbonate, calcium sulfate, barium sulfate, calcium stearate, zinc stearate, polyethylene, polypropylene and polyfluoroethylene. Among these materials, one or more of titanium oxide, calcium carbonate, calcium sulfate and polyethylene are particularly preferred.

The amount of the sub-component (e) may be 0.2–30.0 times by weight or preferably 0.6–20.0 times by weight, both, the solid emulsion component [A].

The proportions of the sub-components (d) and (e) may range from 90:10 to 10:90 or preferably from 80:20 to 20:80 by weight. If the proportion of the sub-component (d) is too high, the resulting composition exhibits good protective power at the expense of removability with hot water, while if that of the sub-component (e) is too high, the resulting composition exhibits good removability with hot water at the expense of protective power. It is therefore not preferred to use the sub-components (d) and (e) in any proportions outside the aforesaid broader range.

Compositions comprising wax and solid powder are well-known, but most of the compositions heretofore in common use are in the form of dispersions of wax and solid powder in a solvent. Not all of the solid powders known in the prior art are useful in the preparation of compositions comprising a dispersion of wax and solid powder in water. As a result of thorough investigations conducted by the present inventors, the sub-component (d) useful in the preparation of the composition of the present invention, most preferably, silica and/or diatomaceous earth have been found to improve the removability with hot water of the composition to a significant extent while the subcomponent (e), i.e., titanium oxide, calcium carbonate or polyfluoroethylene is a sub-component which rather degrades the removability with hot water. On the other hand, a composition comprising a dispersion of the sub-component (d) and wax in water results in a poor state of the paint surface after removal of the weather-resistant coating. It has however been found that an excellent aqueous composition, which is suitable for the protection of paint surfaces, can be obtained for the first time by the combined use of the sub-components (d) and (e) in the above-specified proportions.

The component [C] (emulsifier) useful in the preparation of the composition of the present invention may be chosen from a wide variety of usual emulsifiers. Nonionic, cationic and anionic emulsifiers are all usable. Of these emulsifiers, cationic emulsifiers are particularly effective as they can ionize and activate the acid groups of the oxygen-containing wax. Typical examples of suitable cationic emulsifiers include ammonia and amines such as triethylamine, triethanolamine, morpholine and the like. Among these cationic emulsifiers, morpholine is more preferred. In the case of nonionic emulsifiers, they may be chosen so as to provide an HLB of 12 to 18 for the oxygen-containing wax (a). Typical examples of suitable nonionic emulsifiers include Span 60, Span 80, Tween 60, Tween 80 and Emulgen 420 (trade names; products of Kao-Atlas Co., Ltd.). Where a cationic emulsifier is used, its effect can be enhanced further by adding an anionic emulsifier (e.g., oleic acid) in an amount less than the equivalent amount of the cationic emulsifier.

The emulsifier may be added in an amount less than 0.2 times by weight or preferably in an amount of 0.005–0.1 times by weight, both, the solid emulsion component [A].

The composition of the present invention has been described in detail with reference to each of its components and sub-components. The composition of this invention can be prepared by combining all the components [A]–[C] as essential components and emulsifying and dispersing them in water. The emulsification and dispersion may be accomplished by using any one of well-known techniques. However, it is preferable to use the components [A]–[C] in a combined amount of 5–100 parts by weight per 100 parts by weight of water.

So long as its ability to afford a high degree of protection to paint surfaces is not impaired, the composition of this invention may contain, in addition to the aforesaid essential components and sub-components, petroleum fraction waxes such as paraffin wax, microcrystalline wax and unpurified paraffin waxes (e.g., slack wax, scale wax and the like) in an amount not greater than 50% by weight based on the amount of the oxygen-containing wax (a). If desired, the composition of the present invention may also contain such additives as antioxidants, ultraviolet absorbents, wax dispersants and the like.

The present invention will next be described specifically by the following Examples.

Example 1

(i) Synthesis of oxygen-containing wax:

A petroleum fraction wax and a polyolefin wax were mixed in equal amounts to provide a raw material for the synthesis of an oxygen-containing wax. As the petroleum fraction wax, was used a 155° F. microcrystalline wax (melting point: 70° C.) obtained through a usual separation and purification step. On the other hand, as the polyolefin wax, was used a white waxy material consisting of a low polymer of ethylene and having a melting point of 39° C., a penetration of 80 or greater, an average-molecular weight of 320, and 42 double bonds per 1,000 carbon atoms (including 88% of vinyl-type unsaturation, 11% of vinylidene-type unsaturation, and 1% of internal vinylene-type unsaturation).

To 100 parts by weight of the raw material, which had been obtained by mixing the petroleum fraction wax and polyolefin wax in equal amounts, was added 12 parts by weight of maleic anhydride. While the resulting mixture was being heated at 165° C. with stirring, a solution of 1 part by weight of di-tertbutyl peroxide in 5 parts by weight of xylene was added thereto. After the stirring was continued for an additional 30 minutes, the mixture was stripped of any volatile matter under reduced pressure and then filtered under pressure to obtain an oxygen-containing wax of a pale-yellow color.

This oxygen-containing wax had a melting point of 73° C., a penetration of 26, an acid value of 85, a saponification value of 85, and an oxygen content of 6.0% by weight.

(ii) Emulsification of solid emulsion component:

While 10.0 g of the oxygen-containing wax synthesized in the above step (i) was being heated at 100° C. with stirring, 1.0 g of a polybutene having a number-average molecular weight of 1260, 10.0 g of a silicone oil having a viscosity of 350 cst. (at 25° C.) and as emulsifiers, 1.0 g of oleic acid and 1.0 g of morpholine were added thereto. To the vigorously stirred mixture was slowly added 50.0 ml of water of 95° C. The resulting white, homogeneous emulsion was passed through a homogenizer (manufactured by Manton-Gaulin Co., Ltd.) under a pressure of 300 kg/cm$^2$ to obtain a good white wax emulsion.

(iii) Preparation of aqueous composition for the protection of paint surfaces

Diatomaceous earth (trade name: Celite 505; product of Johns-Manville International Corp.; silicon content: 87% by weight), titanium oxide (trade name: Tipaque R-780; product of Ishihara Sangyo Kaisha, Ltd.) and calcium carbonate (trade name: Hakuenka pz; product of Shiraishi Calcium K.K.) were preliminary dispersed at a weight ratio of 6:3:10 in water to form a 41% paste, and 185.4 g of this paste was added with stirring to 14.6 g of the wax emulsion obtained in the above step (ii) so that an aqueous composition was obtained. This composition had a viscosity of 800 centipoises (at 25° C.) and a specific gravity of about 1.2. It neither formed any precipitate nor showed any change in viscosity after being allowed to stand at room temperature for 2 weeks.

The following performance evaluations were effected on the above-obtained aqueous composition of the present invention, which was suited for the protection of paint surfaces. Evaluation results are summarized in Table 1.

Procedure for Performance Evaluation:

Test pieces were prepared in the following manner for use in the following Tests (1)–(4).

A black-pigmented amino-alkyd resin was baked on 150 mm×70 mm mild steel plates (1 mm thick) to provide test pieces. An emulsion was spray-coated onto the test pieces through a nozzle. The thus-coated test pieces were allowed to stand at room temperature for 24 hours, thereby drying them. When calculated from the increases in weight, the thicknesses of the resulting wax coatings were found to be 15 μm on average.

[Tests]

(1) Appearance of protective coatings:
Their appearance were visually observed.

(2) Test on heat resistance:
Each test piece was placed vertically in a thermostatic chamber and allowed to stand at 80° C. for 96 hours. Then, the wax coating was examined for sagging, running, crazing and other changes. Next, the wax coating was washed off with hot water and a kitchen detergent and then wiped with gauze. Thereafter, the alkyd-painted surface was examined for loss in luster, swelling and other changes. The results were rated on the basis of the following three-stage ranking system: ○=no changes; Δ=slight changes; and ×=considerable changes.

(3) Accelerated weathering test:

(Test on paint surfaces)

Each test piece was placed in a Sunshine Weatherometer manufactured by Toyo Rika Kogyo K.K. and allowed to stand at 63° C. for 250 hours. During this period, cold water was poured over the test piece for 18 minutes at intervals of 2 hours. After the removal of the wax coating, the painted surface (paint surface) was examined for stains, spots, loss in luster, and other changes. Results were rated on the basis of the following 4-stage ranking system:◉= absolutely no changes ○=slight changes; Δ=some changes; and × =considerable changes.

(Test on removability)

From a position about 50 mm apart from each test piece, steam of 1 kg./cm²G was blown for 10 seconds against each test piece through a nozzle having an orifice diameter of approximately 3 mm. Then, the diameter of the resulting circular mark where the wax coating had been removed was measured. Results were rated on the following basis: ◉=20 mm or greater;○= 15 mm or greater but less than 20 mm; Δ=8 mm or greater but less than 15 mm; and ×=less than 8 mm.

(4) Test on protective power:

(Test on protection against iron dust)

An ample amount of iron dust was sprinkled over each test piece, which was then dried at 80° C. for 5 hours in a thermostatic chamber and then allowed to stand at room temperature for one hour. Thereafter, the test piece was continuously subjected to a salt water spray test for 24 hours according to the procedure described in JIS Z2371 and then allowed to stand for 24 hours. After the test piece was washed with hot water and a detergent to remove the iron dust and coating, the painted surface was examined for rust formation and damages by iron dust. Results were rated on the following basis: =no rust formation; ×=appreciable rust formation.

(Test on resistance to sulfuric acid)

Onto each test piece, 0.1 ml of 6% sulfuric acid was dropped locally. The test piece was left over at room temperature for 24 hours. Thereafter, its coating was washed off with hot water and a detergent. The painted surface was air-dried and examined for discolored traces and attack by sulfuric acid. Results were rated on the following basis○=no discolored traces; Δ=slightly discolored traces; and ×=clearly discolored traces.

(5) Outdoor weathering test:

(Test on coatings)

Automobile doors (painted in black) were respectively coated with the sample emulsions by means of an Iwata Air Spray Gun Model W-61. After exposing the thus-coated automobile doors for 3 months in the summer in Okinawa, Japan, changes in state of the wax coatings were examined. Results were rated on the basis of the following 4-stage ranking system:◉ =absolutely no changes;○=slight changes; Δ=some changes; and ×=considerable changes.

(Test on paint surfaces)

The above-described wax coatings were removed by a hot-water car washer. Thereafter, the painted surfaces (paint surfaces) were examined for stains, spots, loss in luster, and other changes. Results were rated in the same manner as in the test on paint surfaces of the above test (3).

(Test on removability)

In the same manner as in the above test on coatings, the respective sample emulsions were coated on automobile doors. After exposing the thus-coated automobile doors for 3 months in the summer in Okinawa, Japan, their wax coatings were removed by a hot-water car washer (water temperature: about 50° C.; water pressure: 80 kg/cm²). The state of removal were observed. Results were rated on the basis of the following 4-state ranking system:◉ =completely removed with ease;○=substantially removed; Δ=somewhat difficult to remove; and ×=not removed.

(6) Test on drying properties:

Using a glass spray nozzle, the sample emulsions were sprayed respectively onto the above painted plates. Immediately after that, the coated painted plates were placed in a tunnel-shaped drying oven having a diameter of 10 cm and a length of 20 cm, through which air was caused to flow by means of a dryer to dry the coatings. From a nozzle connected to a water faucet, a shower of water was applied to the painted plates. The drying time for each sample emulsion was defined as the minimum time at which neither swelling nor peeling of the coating was observed (at room temperature and an air flow velocity of approximately 4 m/sec.). Results were rated on the following basis:○=dried in 3 minutes; and ×=required more than 3 minutes for drying.

Examples 2–8

Using the same components as those employed in Example 1, aqueous compositions of this invention which were suited for the protection of paint surfaces were respectively prepared with the proportions given in Table 1 and in the same manner as in Example 1. Their performances were also evaluated in the same manner as in Example 1. Results are also summarized in Table 1.

In Examples 3 and 4, talc (trade name: FT; product of Nippon Talc K.K.; silicon content: 60% by weight) was used in lieu of diatomaceous earth. In Example 7, triethanol amine was used as an emulsifier in place of morpholine.

Example 9

In the same manner as in Example 1, an aqueous composition of this invention, which was suited for the protection of paint surfaces, was prepared by using the same components as those employed in Example 1 in the proportions given in Table 1 except that beeswax having an oxygen content of 3.6% by weight and a melting point of 61° C. was employed as an oxygen-containing wax. Its performance was evaluated in the same manner as in Example 1. Results are given in Table 1.

Comparative Examples 1–6

For the sake of comparison, aqueous compositions were prepared with proportions given in Table 1 in the same manner as in Example 1 except that neither polybutene nor silicone oil were incorporated (Comparative Example 1), the polybutene was not used (Comparative Examples 2–4), the silicone oil was not employed (Comparative Example 5) and the sub-component (e) was incorporated in an excess amount (Comparative Example 6). The performances of these compositions were evaluated in the same manner as in Example 1. Results are also given in Table 1.

TABLE 1

|  |  | Example No. |  |  |  |  |  |  |  |  | Comparative Example No. |  |  |  |  |  |
|---|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 | 6 |
| Composition (parts by weight) | | | | | | | | | | | | | | | | |
| (a) | Synthetic oxygen-containing wax | 1.0 | 0.6 | 1.5 | 4.0 | 4.0 | 3.6 | 2.8 | 2.4 | 2.4 | 8.0 | 4.5 | 3.0 | 3.0 | 4.5 | 0.3 |
|  | Beeswax | | | | | | | | | | | | | | | |
| (b) | Polybutene | 0.1 | 0.1 | 0.1 | 1.0 | 1.0 | 0.8 | 0.6 | 0.2 | 0.2 | | | | | 1.5 | 0.1 |
| (c) | Silicone oil | 1.0 | 0.6 | 1.5 | 4.0 | 4.0 | 3.6 | 2.8 | 2.4 | 2.4 | | 1.5 | 3.0 | 1.0 | | 0.3 |
| (d) | Diatomaceous earth | 12.0 | 12.0 | | | 7.0 | 9.5 | 11.2 | 10.0 | 10.0 | 12.0 | | 15.0 | 15.0 | 15.0 | 12.0 |
|  | Talc | | | 10.0 | 12.0 | | | | | | | 15.0 | | | | |
| (e) | Titanium oxide | 6.0 | 6.0 | 5.0 | 3.0 | 3.0 | 4.0 | 4.0 | 5.4 | 5.4 | 5.0 | 4.0 | 4.0 | 4.0 | 4.0 | 6.0 |
|  | Calcium carbonate | 20.0 | 20.0 | 15.0 | 13.0 | 13.0 | 13.5 | 16.0 | 10.0 | 10.0 | 1.0 | 5.0 | 5.0 | 5.0 | 5.0 | 20.0 |
| [C] | Morpholine | 0.1 | 0.05 | 0.1 | 0.1 | 0.1 | 0.1 | | 0.1 | 0.1 | 0.1 | 0.1 | 0.1 | 0.1 | 0.1 | 0.05 |
|  | Triethanol amine | | | | | | | 0.1 | | | | | | | | |
|  | Oleic acid | 0.1 | 0.05 | 0.1 | 0.1 | 0.1 | 0.1 | 0.1 | 0.1 | 0.1 | 0.1 | 0.1 | 0.1 | 0.1 | 0.1 | 0.05 |
| Water | | 59.7 | 60.6 | 66.7 | 62.8 | 67.8 | 64.8 | 62.4 | 69.4 | 69.4 | 73.8 | 69.8 | 69.8 | 71.8 | 69.8 | 61.2 |
| Performance evaluation | | | | | | | | | | | | | | | | |
| (1) | Appearance of protective coating | White and smooth ||||||||||||||| 
| (2) | Heat resistance test | ○ | ○ | ○ | ○ | ○ | ○ | ○ | ○ | ○ | ○ | ○ | ○ | ○ | ○ | ○ |
| (3) | Accelerated weathering test | | | | | | | | | | | | | | | |
|  | Paint surface | ◎ | ○ | ◎ | ◎ | ○ | ◎ | ◎ | ○ | ○ | ◎ | △ | X | X | X | X |
|  | Removability | ◎ | ◎ | ◎ | ○ | ○ | ○ | ◎ | ○ | ○ | ○ | ○ | ○ | ○ | X | ○ |
| (4) | Protective power test | | | | | | | | | | | | | | | |
|  | Resistance to iron dust | ○ | ○ | ○ | ○ | ○ | ○ | ○ | ○ | ○ | ○ | ○ | X | X | X | X |
|  | Resistance to sulfuric acid | ○ | △ | ○ | ○ | ○ | ○ | ○ | ○ | ○ | ○ | ○ | ○ | X | X | X |
| (5) | Outdoor weathering test | | | | | | | | | | | | | | | |
|  | Protective coating | ◎ | ○ | ◎ | ◎ | ◎ | ◎ | ○ | ○ | △ | X | X | X | X | ○ | X |
|  | Paint surface | ◎ | ◎ | ◎ | ◎ | ○ | ◎ | ○ | ◎ | ◎ | ○ | ○ | ○ | △ | △ | X |
|  | Removability | ◎ | ◎ | ◎ | ○ | △ | △ | ○ | ◎ | ◎ | X | ○ | ○ | ○ | X | ○ |
| (6) | Drying property test | ○ | ○ | ○ | ○ | ○ | ○ | ○ | ○ | ○ | ○ | ○ | ○ | ○ | X | ○ |

As apparent from the results of performance evaluation in Table 1, the compositions of Examples 1-9 which pertained to the present invention showed excellent properties even under severe conditions in the evaluation of all performances such as strengths of the protective coatings, removability of the protective coatings, the state of associated paint surfaces after removal of the protective coatings, and the drying properties of the protective coatings.

Contrary to the compositions of Examples 1-9, the composition of Comparative Example 1, in which the sub-components (b) and (c) were not used, showed poor coating properties and removability in the outdoor weathering test (5) conducted under the severe environmental conditions. The compositions of Comparative Examples 2-4, in which the sub-component (b) was not used, were improved with respect to the removability in the outdoor weathering test (5) compared with the composition of Comparative Example 1, but they, on the other hand, gave poor results in the accelerated weathering test (3) and the protective power test (4). Therefore, the compositions of Comparative Examples 2-4 were also dissatisfactory. On the other hand, the composition of Comparative Example 5 in which the sub-component (c) was not used and the composition of Comparative Example 6 in which the amount of the sub-component (e) was too much gave poor results with respect to most of the tested properties. They were hence unsuited for practical applications.

The aqueous composition of the present invention has the following effects:

(1) Since it contains no solvent, the dangers of environmental pollution and fire hazard are eliminated and, moreover, good economy is achieved by avoiding waste of resources.

(2) It shows excellent weather resistance even under severe environmental conditions.

(3) It is excellent in water resistance, heat resistance, weather resistance and drying properties.

(4) It can afford a high degree of protection to paint surfaces.

(5) It has a reasonable degree of strippability and, therefore, can readily be removed by means of a hot water cleaner.

Thus, the composition of the present invention is most suitable for the purpose of protecting the paint surfaces of automobiles and the like.

What is claimed is:

1. An aqueous composition for the protection of paint surfaces which comprises, as essential components emulsified and dispersed in water, the following components [A], [B] and [C]:

[A] a solid emulsion component composed of the following sub-components (a)-(c):
  (a) 100 parts by weight of an oxygen-containing wax having an oxygen content of not less than 3.0% by weight and a melting point of 50° to 85° C.,
  (b) 0.1-60 parts by weight of a polybutene having a number-average molecular weight of 300-3,000, and
  (c) 10-200 parts by weight of a silicone oil having a viscosity of 50-5,000 cst. at 25° C.;

[B] a powdery emulsion component composed of the following sub-components (d)-(e):
  (d) 0.2-20.0 times by weight the solid emulsion component [A] of substantially white-colored fine powder of an inorganic material having a silicon content of not less than 23% by weight, and (e) 0.2–30.0 times by weight the solid emulsion component [A] of white-colored fine powder of an inorganic or organic material substantially free of silicon; and

[C] less than 0.2 times by weight the solid emulsion component [A] of an emulsifier component.

2. An aqueous composition as claimed in claim 1, wherein the sub-component (a) comprises one or more substances selected from the group consisting of natural waxes such as carnauba wax, montan wax, rice bran wax, beeswax and Japan wax; synthetic waxes such as oxidized mircrocrystalline wax and oxidized paraffin wax; the secondary products obtained by further modifying the foregoing waxes through various reactions; and mixtures thereof.

3. An aqueous composition as claimed in claim 1, wherein the sub-component (a) is a product obtained by the reaction of a hydrocarbon wax having a melting point of 50 to 85° C. with an unsaturated polycarboxylic acid or an anhydride thereof.

4. An aqueous composition as claimed in claim 1, wherein the sub-component (a) is a product obtained by the reaction of a mixture, which consists of a hydrocarbon wax having a melting point of 50° to 85° C. and a polyolefin wax having a melting point of 36° to 120° C., a number-average molecular weight of 310 to 1,000, and 5 to 50 double bonds per 1,000 carbon atoms, with an unsaturated polycarboxylic acid or an anhydride thereof.

5. An aqueous composition as claimed in claim 1, wherein the sub-component (b) is a polybutene having a number-average molecular weight of 700 to 1,500.

6. An aqueous composition as claimed in claim 1, wherein the sub-component (b) has been prepared in accordance with a polymerization process known per se in the art, using as a raw material a mixture which contains butene-1, butene-2, isobutylene and as inert components, butanes.

7. An aqueous composition as claimed in claim 1, wherein the sub-component (b) is a hydrogenated polybutene.

8. An aqueous composition as claimed in claim 1, wherein the sub-component (b) is contained in an amount of 0.5 to 30 parts by weight per 100 parts by weight of the sub-component (a).

9. An aqueous composition as claimed in claim 1, wherein the sub-component (c) is a silicone oil having a viscosity of 100 to 1,000 cst. at 25° C.

10. An aqueous composition as claimed in claim 1, wherein the sub-component (c) comprises a straight-chain dimethylpolysiloxane or diphenylpolysiloxane of a relatively low polymerization degree.

11. An aqueous composition as claimed in claim 1, wherein the sub-component (c) is contained in an amount of 30 to 120 parts by weight per 100 parts by weight of the sub-component (a).

12. An aqueous composition as claimed in claim 1, wherein the sub-component (d) comprises one or more materials selected from white-, gray- or cream-colored fine powders of silica, clay, diatomaceous earth, talc, aluminum silicate, calcium silicate and zeolite.

13. An aqueous composition as claimed in claim 1, wherein the sub-component (d) comprises one or more materials selected from silica, diatomaceous earth and talc, the silicon contents of which are about 34% by weight or higher.

14. An aqueous composition as claimed in claim 1, wherein the sub-component (d) is contained in an amount 0.6 to 15.0 times by weight the amount of the component [A].

15. An aqueous composition as claimed in claim 1, wherein the sub-component (e) comprises one or more materials selected from titanium oxide, zinc oxide, calcium carbonate, magnesium carbonate, barium carbonate, calcium sulfate, barium sulfate, calcium stearate, zinc stearate, polyethylene, polystyrene and polyfluoroethylene.

16. An aqueous composition as claimed in claim 15, wherein the sub-component (e) comprises one or more materials selected from titanium oxide, calcium carbonate, calcium sulfate and polyethylene.

17. An aqueous composition as claimed in claim 1, wherein the sub-component (e) is contained in an amount 0.6 to 20.0 times by weight the amount of the component [A].

18. An aqueous composition as claimed in claim 1, wherein the proportions of the sub-component (d) and sub-component (e) range from 90:10 to 10:90.

19. An aqueous composition as claimed in claim 18, wherein the proportions of the sub-component (d) and sub-component (e) range from 80:20 to 20:80.

20. An aqueous composition as claimed in claim 1, wherein the component [C] is a cationic emulsifier.

21. An aqueous composition as claimed in claim 1, wherein the component [C] is a mixture of a cationic emulsifier and an anionic emulsifier, the amount of said anionic emulsifier being less than the equivalent of said cationic emulsifier.

22. An aqueous composition as claimed in claim 1, wherein the component [C] is contained in an amount 0.005 to 0.1 times by weight the amount of the component [A].

23. An aqueous composition as claimed in claim 1, wherein the total amount of the components [A], [B] and [C] is 5 to 100 parts by weight per 100 parts by weight of water.

24. A method for the protection of a painted surface which comprises applying the composition of claim 1 to the painted surface to form a protective coating thereon.

25. A method for the temporary protection of a painted surface which comprises applying the composition of claim 1 to the painted surface to form a protective coating thereon, and after a temporary period of protection then applying hot water or steam to the coating for substantially removing the coating thereby.

* * * * *